Figure 1:
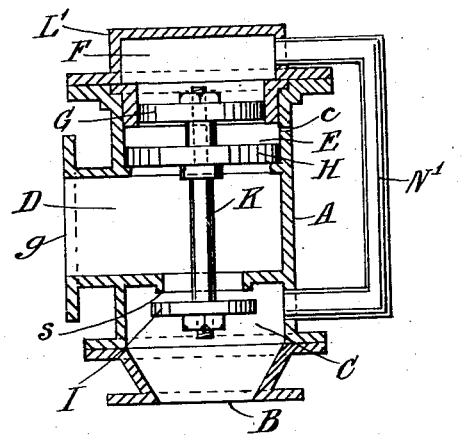

O. M. JONES.
PRESSURE REGULATING VALVE.
APPLICATION FILED SEPT. 9, 1918.

1,364,061.

Patented Dec. 28, 1920.
2 SHEETS—SHEET 1.

INVENTOR
Owen Marshall Jones

O. M. JONES.
PRESSURE REGULATING VALVE.
APPLICATION FILED SEPT. 9, 1918.

1,364,061.

Patented Dec. 28, 1920.
2 SHEETS—SHEET 2.

INVENTOR
Owen Marshall Jones

UNITED STATES PATENT OFFICE.

OWEN MARSHALL JONES, OF NEW YORK, N. Y.

PRESSURE-REGULATING VALVE.

1,364,061.

Specification of Letters Patent.   Patented Dec. 28, 1920.

Application filed September 9, 1918. Serial No. 253,264.

*To all whom it may concern:*

Be it known that I, OWEN MARSHALL JONES, a citizen of the United States, and a resident of the borough of Manhattan, city, county, and State of New York, (whose postoffice address is 601 West 149th street, New York city, New York,) have invented Improvements in Pressure-Regulating Valves, of which the following is a specification.

This invention relates to improvements in valves of the type known as pressure regulating valves, which are used to regulate the pressure of fluids in containers into which fluid under pressure is delivered through the valve. This particularly applies where the pressure to be maintained in the containers is less than the fluid pressure in the means from which the container is supplied through the fluid pressure regulating valve. This type of valve is employed to automatically close and shut off the supply of fluid to the container when the pressure in the container has reached the predetermined desired pressure. This invention is an improvement on my invention covered by Patent No. 1,205,898 granted me November 21, 1916. I have embodied in this present invention additional mechanism and devices and have eliminated some of the parts embodied in the invention referred to and have designed the piston H of a diameter greater than the diameter of the piston G so that the valve can be used for and will perform the functions above stated. This invention may be used in any connection in which it is found applicable.

In commonly speaking of this class of valve the chamber in the valve body located between the inlet and the valve seat is referred to as the high pressure side of the valve, and the chamber located between the valve seat and the outlet from the valve body is referred to as the low pressure side of the valve. Therefore I will use these terms in stating the objects of this invention, in the description of the accompanying drawings, and in stating the operation of the valve.

The objects of the invention are to improve upon and simplify the construction of such valves and to increase their ability and efficiency to automatically shut off the flow of fluids through them.

Other objects of the invention are to eliminate chattering of the valve and shock of the valve when seating.

Further objects are to produce such valves which will be sensitive and will operate promptly when the desired fluid pressure to be maintained is reached.

Further objects are to produce a valve of this class in which mechanical friction is eliminated as far as possible.

Further objects are to produce a valve of this class which may not be adjustable and will be closed only by the specific operating pressure for which it is designed.

Further objects are to produce a valve of this class with means for adjusting it so that it will operate by any one of the range of pressures for which it is designed.

Further objects are to produce a valve of this class which will close and remain closed when one or both of the pressure actuated means which automatically open or close the valve become inefficient due to being ruptured, leaky or any other cause.

Further objects are to produce a valve of this class in which both the automatic opening and closing of the valve is performed by means controlled by the pressure in the low pressure side of the valve.

Further objects will be apparent from the following description.

An illustrative embodiment of the invention has been selected herein for the purpose of description, same being shown in the accompanying drawings, wherein—

Figure 2:
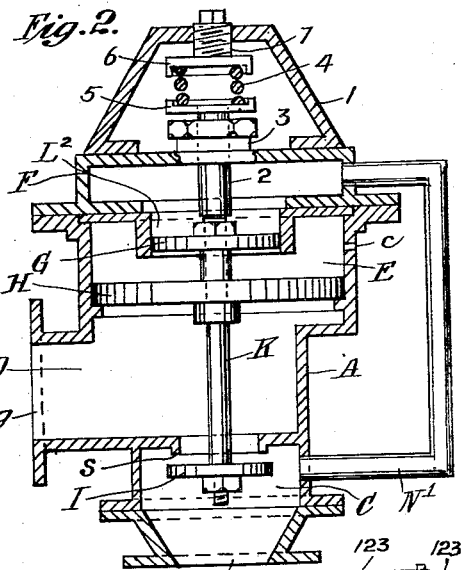
Figures 3, 4:
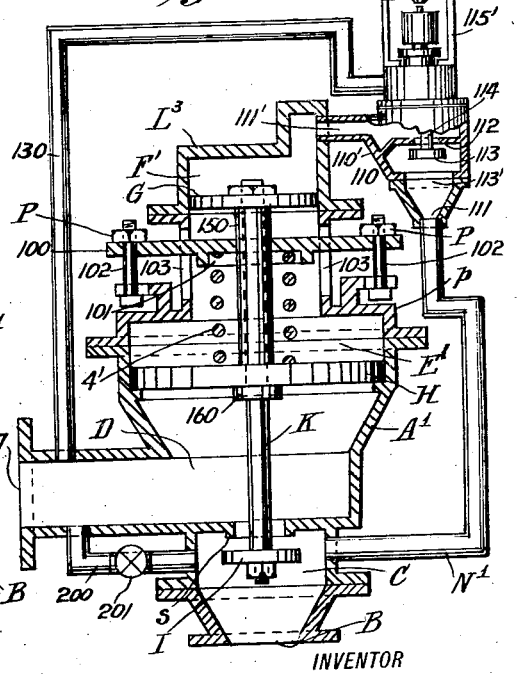
Figure 5:
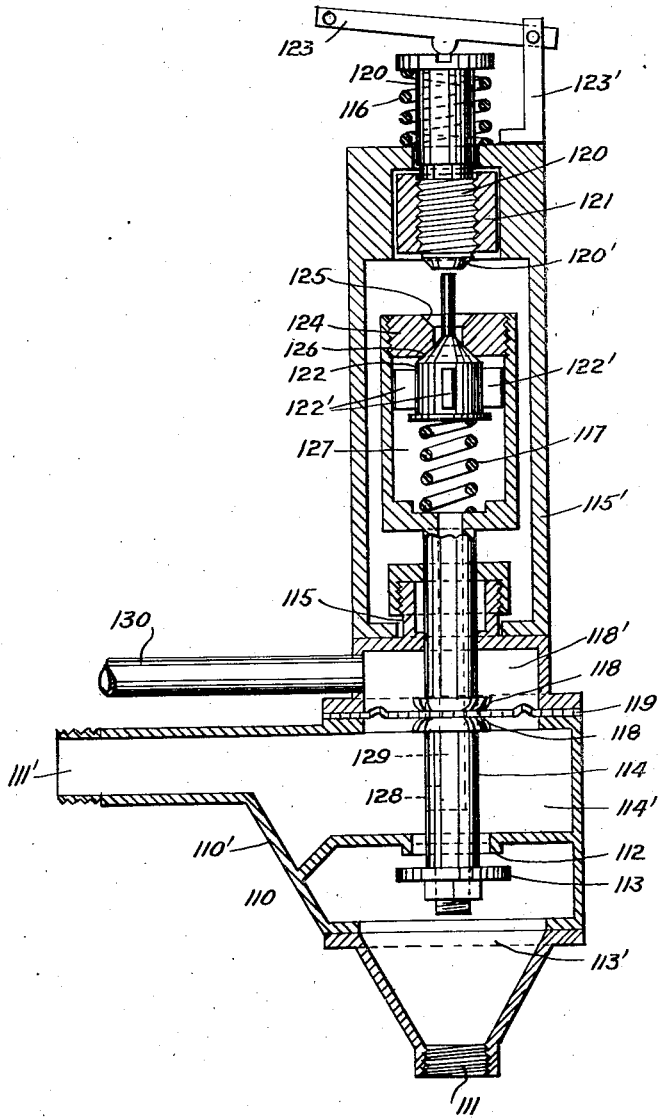

Figure 1 is a longitudinal section of a form of this type of valve which is without means of adjustment, Fig. 2 is a modification of Fig. 1 and has means of adjustment to operate under variable pressures, Fig. 3 is another modification of Figs. 1 and 2, Fig. 4 is an illustration of the valve partly in longitudinal section and is a modification of Figs. 1 and 2, and Fig. 5 illustrates a longitudinal view of an enlargement of the pilot valve embodied in Fig. 4 partly in section.

Referring to the drawings,

In Fig. 1 I have illustrated a valve which is not adjustable for varying pressure in the low pressure side, and have shown a valve body, the parts therein and attached thereto; this view shows the valve open. A valve of this construction is used where a positive pressure regulating valve is required, in other words where the valve is to be produced for maintaining a specific pressure in the low pressure side of the valve.

A is a valve body or casing which may be of any suitable metal. I am not to be understood as limiting myself to this particular form of body as other forms may be used in accordance with my invention. B is the inlet. C is the valve chamber in which the valve I travels longitudinally. s is a valve seat extending into the valve chamber. D is the discharge chamber with the outlet g. E is a piston chamber in which piston H travels longitudinally. This piston is for closing the valve when sufficient pressure is applied against the bottom of it. F is a piston chamber in which piston G travels longitudinally. This piston is for opening the valve when sufficient pressure is applied against the top of it. The two pistons are of the proper diameters to perform the functions for which they are designed, and each is of a diameter greater than the diameter of the valve, and the piston H is of a diameter greater than the diameter of the piston G. L' is a hollow top cover and also forms part of the piston chamber F. N' is a by-pass connecting the two end chambers of the casing. K is a spindle or rod on which the two pistons and the valve are rigidly mounted in their respective positions on a common axis, therefore the pistons and valve travel simultaneously in like directions. c is a port for admitting and exhausting air between the two pistons, the air forming a cushion so that the pistons will move slowly upwardly or downwardly to prevent the shock on the valve or on the pistons at the end of their travel.

The operation of the valve is as follows: The fluid under pressure enters the valve chamber C through the inlet B and passes through the by-pass N' into piston chamber F and forces the piston G downwardly which opens and holds upon the valve I. The fluid then flows around the valve and through the opening in the seat and enters the discharge chamber and passes out through the outlet g to the vessel in which is to be maintained a pressure less than the pressure of the fluid entering the valve body. When the pressure on the low pressure side of the valve rises to the desired predetermined pressure, the piston H is forced upwardly and the valve is closed and held closed by the pressure thus exerted against the piston H. The valve thus remains closed until the pressure against the piston H decreases, then the valve is again opened by the pressure exerted against the piston G.

In Fig. 2 I have shown a modification of the valve shown in Fig. 1 in so far that I have modified the shape of the body, have embodied a stuffing box on top of the bonnet, a ring on the inside of the bonnet which is an integral part of it, pressure resisting means for exerting pressure against the spindle K and a yoke on top of the bonnet. In all other respects and in operation, this form of valve is similar to the valve shown in Fig. 1. The pressure resisting means therein shown is for adjustment so that the piston H can be made responsive to varying pressure in the low pressure side of the valve. In other words the pressure resisting means can be adjusted so the valve will be closed at one of many predetermined pressures in the low pressure side within the range of pressures for which the valve is designed, the pressure resisting means exerting pressure against the upper end of the spindle K. I have preferably shown the pressure resisting means in the form of a spring in combination with several other parts. Referring to the pressure resisting means 4 is a spring. 5 and 6 are plates between which the spring is engaged. 2 is a rod attached to plate 5 and passes through the stuffing box 3 and the chamber F and engages the upper end of the spindle K. 7 is an adjusting screw for increasing or decreasing the compression of the spring 4. 1 is a yoke for carrying the adjusting screw and is suitably attached to or may be an integral part of the bonnet.

The operation of the pressure resisting means is as follows: The spring is set so that it will yield to an average pressure exerted against the bottom of the piston H. If the pressure on the low pressure side of the valve is lower than the average for which the spring is set, then the compression of the spring is accordingly decreased. If the pressure in the low pressure side of the valve is higher than the pressure for which the spring was originally set, then the compression of the spring is increased. In this way the valve can be set to automatically close at different desired predetermined pressures in the low pressure side.

In Fig. 3 I have shown a modification of Fig. 2 in so far as the design of the body, the bonnet, the spindle and the pressure resisting means are concerned and that I have eliminated the stuffing box and have substituted the flexible diaphragms G' and H' for pistons G and H respectively and have embodied a connecting shell p between the lower section of the valve body and the uppermost piston chamber and placed a bonnet or cover at the upper end of the shell so as to provide a chamber in which diaphragm G' can travel.

The operation of the diaphragm, the valve, and the pressure resisting means are respectively similar to the corresponding parts in Fig. 2. Referring to the pressure resisting means 4' is a spring engaged between the plates 100 and 5' and is adjustable to yield to varying pressure exerted against the bottom of the diaphragm H' and under variable compression exerts variable downward pressure against the diaphragm H' thus resisting pressure under the diaphragm H'. The spring is placed under compression by screwing downwardly the nuts P and P on the bolts 102 and 102 which engage the ends of the plate 100 protruding through the openings 103 and 103 in the wall of the shell $p$ and the compression is decreased by screwing the nuts upwardly. The operation of the resisting means is the same as the resisting means in Fig. 2, in that it is originally set to yield to an average pressure under the diaphragm H'. If the valve is to be closed when the pressure in the low pressure side exerted against the bottom of the diaphragm H' is less than the average pressure for which the spring has been set, then the compression of the spring is accordingly decreased. If the valve is to be closed when the pressure in the low pressure side exerted against the bottom of the diaphragm H' is more than the average pressure for which the spring has been set, then the compression of the spring is accordingly increased.

In Fig. 4 I have shown a modification of Fig. 2 in so far as the design of the body, the bonnet and the pressure resisting means are concerned and that I have eliminated the stuffing box and yoke shown on top of the bonnet in Fig. 2. The pressure resisting means embodied in this valve is similar to that shown in Fig. 3. In this valve I have embodied a shell for connecting the lower section of the valve body and the uppermost piston chamber, the by-pass N' with a pilot valve located therein, the pilot valve being shown in side elevation in this figure with a portion of the body broken away and in detail in the longitudinal cross-section view in Fig 5, a by-pass connecting the high pressure side with the low pressure side of the valve, and a by-pass connecting the low pressure side of the valve with the piston chamber in the top of the pilot valve body. In addition to performing the functions which are performed by the valves shown in Figs. 1 and 2, this valve will close and remain closed when one or both of the pressure actuated means which automatically open or close the valve become inefficient due to being ruptured, leaky or any other cause, and the means for automatically opening and closing the valve are controlled alone by the pressure in the low pressure side of the valve, as will be apparent from the following description in which I refer jointly to Fig. 5 in stating the details of the features, parts, performance, functions and operation of the pilot valve. A' is a valve body or casing which may be of any suitable metal.

I am not to be understood as limiting myself to this particular form of body as other forms may be used in accordance with my invention. B is the inlet. C is the valve chamber in which the valve I travels longitudinally. $s$ is a valve seat extending into the valve chamber. D is the discharge chamber with the outlet $g$. E' is the piston chamber in which piston H travels longitudinally, and the piston is for closing the valve when sufficient pressure is applied against the bottom of it. F' is a piston chamber in which piston G travels longitudinally and this piston is for opening the valve when sufficient pressure is applied against the top of it. The two pistons are of the proper diameters to perform the functions for which they are designed and each is of a diameter greater than the diameter of the valve and the piston H is of a diameter greater than the diameter of the piston G. $L^3$ is a hollow top cover in which the piston chamber F' is located. K is a spindle or rod on which the two pistons and the valve are rigidly mounted in their respective positions on a common axis, therefore the pistons and the valve travel simultaneously in like directions. N' is a by-pass connecting the valve chamber C with the inlet end of the pilot valve 110. 4' is a pressure resisting means preferably shown herein in the form of a spring engaged between the plate 100 and the top of the piston H, the spring is adjustable to yield to varying pressure exerted against the bottom of the piston H and under variable compression exerts variable downward pressure against the piston H, thus resisting pressure under the piston H. The spring is placed under compression by screwing downwardly the nuts P on the bolts 102 which engage the ends of the plate 100 protruding through the openings 103 in the wall of the connecting shell $p$, and the compression is decreased by screwing the nuts upwardly. 110 is a pilot valve connected to the piston chamber F', comprising a valve body or casing having an inlet 111 and an outlet 111', a valve chamber 113', a valve 113 in the valve chamber opening toward the inlet 111, a valve seat 112 extending into the valve chamber 113', a diaphragm 119 operating in the diaphragm chamber 118' for actuating the valve 113, a spindle 114 having a hollow enlargement at its upper end with the chamber 127 therein and a port 129 axially located in the spindle connecting the opening 128 in the side of that portion of the spindle extending through the discharge chamber with the chamber in the hollow enlarged end, the spindle passes through the stuffing box 115, the diaphragm 119 and the valve 113, the valve and the diaphragm are rigidly mounted on the spindle by suitable means, a yoke 115', a slidably movable pin 120 with a flanged head and a conical end and a screw thread adjacent to the end, the pin to be forced downwardly to hold the valve 113 open at will, a slidably movable screw sleeve 121 engaged by the screw thread of the pin 120, a spring 116 engaged between the flanged head of the pin 120 and the top of the yoke 115' for holding up the pin 120, a lever post 123' to which is attached the lever 123 the lever is for forcing downwardly the pin 120 and the screw sleeve 121 for opening the valve 113 at will, an exhaust valve 122 with a pin extending upwardly from its beveled end operatable in the chamber 127 for stopping the flow of fluid through the port 129 in the spindle, a spring 117 located between the bottom of the chamber 127 and the underside of the valve 122 for holding the valve up, and a valve seat 124 in the end of the chamber 127 in the enlarged end of the spindle 114 with a beveled seat 126 in its under side and a beveled seat 125 in its upper side with a port forming an opening between and connecting the two seats. 200 is a by-pass with the stop valve 201 located therein connecting the high pressure with the low pressure side of the valve. By eliminating from this valve the by-pass 200, the by-pass 130, the pilot valve 110 and connecting the upper end of the by-pass N' to the upper piston chamber, and the pressure resisting means, then the valve would operate similar to the valve shown in Fig. 1. By eliminating all of the above mentioned parts with the exception of the pressure resisting means the valve would then operate similar to the valve shown in Fig. 2.

The operation of this valve complete with all the parts herein shown and described is as follows: To start this valve operating it is necessary to set the spring 4' so it will yield to the predetermined pressure desired to be maintained in the low pressure side of the valve, then open the stop valve 201 to permit fluid from the high pressure side of the valve to flow through the by-pass 200, or by employing a by-pass around the valve which in general practice is installed where a pressure regulating valve is used, thereby pressure is supplied to the low pressure side of the valve and passes through the by-pass 130 to the diaphragm chamber 118' in the pilot valve and forces the diaphragm downwardly, then the stop valve 201 is closed, the diaphragm when forced downwardly moves the valve 113 from its seat and holds it away from its seat as the diaphragm is designed of a sufficient area so that a very low pressure from the low pressure side of the valve will overcome the pressure from the high pressure side of the valve exerted against the under side of the valve 113 through the by-pass N'. The fluid passes through the by-pass N' and through the opening in the seat 112 through the discharge chamber 114' and into the piston chamber F' and forces the piston G downwardly and opens the valve I, the valves are then in the positions shown in the drawings. The fluid will continue to flow through the valve seat s until the predetermined pressure desired in the low pressure side of the valve is reached. If that pressure is exceeded the piston H is moved upwardly and closes the valve I and holds it closed until the pressure in the low pressure side of the valve drops to the normal pressure desired to be maintained, then the valve is again opened. It is obvious that the means by which the valve is automatically opened and closed are controlled by the fluid pressure supplied from the low pressure side of the valve when the valve operates entirely automatically. The valve can be started to operate by moving downwardly the pin 120 against the end of the pilot valve spindle by forcing it downwardly by pulling the lever 123 downwardly thereby bringing the conical end of the pin into engagement with the seat 125 thus closing the outlet through the seat, and by continuing to move the pin downwardly until the valve 113 is moved away from its seat and by holding it away from its seat will allow pressure from the high pressure side of the valve to be exerted against the piston G. The pilot valve will be kept open until sufficient pressure enters the low pressure side of the valve and through the by-pass 130 against the diaphragm 119 to hold the pilot valve open. The pin when employed as above together with the spindle 114, the valve 113 and the piston G forms means by which the valve can be opened at will as desired, and would also permit of the valve being started in operation without the necessity of opening the by-passes connecting the high and low pressure sides of the valve, and when it is not desired to have the means by which the automatic opening and closing of the valve is performed controlled alone by the fluid pressure supplied from the low pressure side of the valve. Should the piston H break, be ruptured or become leaky or damaged from any cause or should there be a leak beyond the low pressure side of the valve thus killing the pressure on top of the diaphragm 119 or should the diaphragm 119 become ruptured or leaky so that pressure could not be maintained on it, then the pressure exerted against the under side of the valve 113 would close that valve and shut off the pressure against the top of the piston G and the pressure against the bottom of the valve I would push the valve I upwardly and close the valve as the fluid remaining in the piston chamber F' would be exhausted through the opening 128 and port 129 in the spindle 114 and pass out around the valve 122 and through the valve seat 126 to atmosphere, the valve 122 having been opened when the valve 113 moved upwardly as the pin on the valve 122 is engaged by the end of the pin 120 which has forced the valve 122 from its seat. Should the piston G break, be ruptured or become leaky or damaged from any cause to such an extent that the pressure for forcing it down to keep the valve open cannot be maintained on the top of the piston then the pressure against the bottom of the valve I will push the valve I upwardly and close the valve and hold it closed. It is obvious that the valve I together with the pressure exerted against the bottom of it form means for automatically closing the valve when the means for automatically opening and closing the valve fail to perform the functions for which they are intended.

It is to be understood where I have shown a piston or pistons and where the words "piston" or "pistons" are used that I do not limit myself to a piston or pistons as it may be desirable to use a flexible diaphragm or other structure performing functions similar to the functions performed by a piston, as in accordance with common understanding a flexible diaphragm is the equivalent of a piston. Nor am I to be understood as limiting myself to the use of a flexible diaphragm where shown and mentioned as it may be desirable to substitute one of its equivalents for it.

Obviously, some features and parts of this invention may be used without others, and my invention may be embodied in widely varying forms. I am not to be understood as limiting myself to the construction and arrangement and combination of parts as shown and described, as other combinations and equivalents of the parts may be used to variously modify my present invention within the scope of the subjoined claims.

Therefore, without limiting myself to the construction shown and described, nor enumerating equivalents, I claim as my invention—

1. In a pressure regulating valve comprising a casing or body having an inlet and an outlet, a valve chamber, a valve in the valve chamber opening toward the inlet, a valve seat extending into the valve chamber with the surface of the face of the valve seat located transversely to the common axis of the casing, a discharge chamber on the opposite side of the valve seat from the valve chamber, two piston chambers located above and in direct line with the discharge chamber, two pistons each of a diameter greater than the diameter of the valve operatable within their respective chambers, one of the said pistons actuates the valve to open it and the other piston actuates the valve to close it, the said chambers and the said valve and the said valve seat are located in the order mentioned and in a direct line on a common axis, a spindle on which the said valve and the said two pistons are rigidly attached in their respective positions and travel simultaneously with it in like directions, and a by-pass connecting the said valve chamber and the uppermost piston chamber for supplying fluid pressure on top of the piston operating in the uppermost piston chamber, as and for the purpose set forth.

2. In a pressure regulating valve comprising a casing or body having an inlet and an outlet, a valve chamber, a valve in the valve chamber opening toward the inlet, a valve seat extending into the valve chamber with the surface of the face of the valve seat located transversely to the common axis of the casing, a discharge chamber on the opposite side of the valve seat from the valve chamber, two piston chambers located above and in direct line with the discharge chamber, two pistons each of a diameter greater than the diameter of the valve operatable within their respective chambers, one of the said pistons actuates the valve to open it and the other piston actuates the valve to close it, the said chambers and the said valve and the said valve seat are located in the order mentioned and in a direct line on a common axis, a spindle on which the said valve and the said two pistons are rigidly attached in their respective positions and travel simultaneously with it in like directions, and a by-pass with a pilot valve located therein connecting the said valve chamber and the uppermost piston chamber for supplying fluid pressure on top of the piston operating in the uppermost piston chamber, as and for the purpose set forth.

3. In a pressure regulating valve comprising a casing or body having an inlet and an outlet, a valve chamber, a valve in the valve chamber opening toward the inlet, a valve seat extending into the valve chamber with the surface of the face of the valve seat located transversely to the common axis of the casing, a discharge chamber on the opposite side of the valve seat from the valve chamber, two piston chambers located above and in direct line with the discharge chamber, two pistons each of a diameter greater than the diameter of the valve operatable within their respective chambers, one of the said pistons actuates the valve to open it and the other piston actuates the valve to close it, the said chambers and the said valve and the said valve seat are located in the order mentioned and in a direct line on a common axis, a spindle on which the said valve and the said two pistons are rigidly attached in their respective positions and travel simultaneously with it in like directions, a by-pass with a pilot valve located therein connecting the said valve chamber and the uppermost piston chamber for supplying fluid pressure on top of the piston operating in the uppermost piston chamber, and pressure resisting means adjustable to exert varying pressure against one of the said pistons located nearest to the said discharge chamber, as and for the purpose set forth.

4. In a pressure regulating valve comprising a casing or body having an inlet and an outlet, a valve chamber, a valve in the valve chamber opening toward the inlet, a valve seat extending into the valve chamber with the surface of the face of the valve seat located transversely to the common axis of the casing, a discharge chamber on the opposite side of the valve seat from the valve chamber, two piston chambers located above and in direct line with the discharge chamber, two pistons each of a diameter greater than the diameter of the valve operatable within their respective chambers, the said chambers and the said valve and the said valve seat are located in the order mentioned and in a direct line on a common axis, a spindle on which the said valve and the said two pistons are rigidly attached in their respective positions, a by-pass with a pilot valve located therein connecting the said valve chamber and the uppermost piston chamber, and a by-pass connecting the diaphragm chamber shown in the said pilot valve with the low pressure side of the first said valve, as and for the purpose set forth.

5. In a pressure regulating valve comprising a casing or body having an inlet and an outlet, a valve chamber, a valve in the valve chamber opening toward the inlet, a valve seat extending into the valve chamber with the surface of the face of the valve seat located transversely to the common axis of the casing, a discharge chamber on the opposite side of the valve seat from the valve chamber, two piston chambers located above and in direct line with the discharge chamber, two pistons each of a diameter greater than the diameter of the valve operatable within their respective chambers, the said chambers and the said valve and the said valve seat are located in the order mentioned and in a direct line on a common axis, a spindle on which the said valve and the said two pistons are rigidly attached in their respective positions, a by-pass with a pilot valve located therein connecting the said valve chamber and the uppermost piston chamber, a by-pass connecting the diaphragm chamber shown in the said pilot valve with the low pressure side of the first said valve, and means adjustable to yield to varying pressure under the one of the said piston chambers located nearest to the said discharge chamber, as and for the purpose set forth.

6. In a pressure regulating valve comprising a casing or body having an inlet and an outlet, a valve chamber, a valve in the valve chamber opening toward the inlet, a valve seat extending into the valve chamber with the surface of the face of the valve seat located transversely to the common axis of the casing, a discharge chamber on the opposite side of the valve seat from the valve chamber, two piston chambers located above and in direct line with the discharge chamber, two pistons each of a diameter greater than the diameter of the valve operatable within their respective chambers, the said chambers and the said valve and the said valve seat are located in the order mentioned and in a direct line on a common axis, a spindle on which the said valve and the said two pistons are rigidly attached in their respective positions, a by-pass with a pilot valve located therein connecting the said valve chamber and the uppermost piston chamber, a by-pass connecting the diaphragm chamber shown in the said pilot valve with the low pressure side of the first said valve, and a by-pass with a stop valve located therein connecting the high pressure side of the valve and the low pressure side of the valve, as and for the purpose set forth.

7. In a pressure regulating valve comprising a valve body or casing having a valve chamber, a valve seat and a valve in the said valve chamber, means for automatically opening and closing the valve, means for automatically closing the valve when the said means for automatically opening and closing the valve fail to perform these functions, means by which the automatic opening and closing of the valve are controlled by the fluid pressure supplied from the low pressure side of the valve, and means by which the valve can be opened at will as desired.

8. In a pressure regulating valve the combination of a valve body or casing having an inlet and an outlet, a valve chamber, a valve seat and a valve in the said valve chamber, and a pilot valve comprising a valve body or casing having an inlet and an outlet, an inlet valve chamber, an inlet valve seat with its face on the side next to the said inlet valve chamber, an inlet valve traveling in the said inlet valve chamber, a discharge chamber on the opposite side of the said inlet valve seat from the said inlet valve chamber, a diaphragm chamber, a diaphragm operatable in the said diaphragm chamber, a spindle on which the said inlet valve and the said diaphragm are rigidly mounted in their respective positions having an enlargement at its top end with a chamber therein and a port axially located in it forming an outlet from the said discharge chamber to the chamber in the enlargement, a disk located in the top of the chamber in the said enlargement at the top of the said spindle having a beveled seat on both its top and bottom sides and a port through its center connecting the two seats, an outlet valve operatable in the chamber in the said enlargement at the top of the said spindle, a pin slidably movable through the top of the said yoke and engaging a slidably movable internally threaded sleeve, a lever engaging the said pin, and a spring engaging the under side of the flanged head of the said pin, as and for the purpose set forth.

9. In a pressure regulating valve comprising a casing or body having an inlet and an outlet, a valve chamber, a valve in the valve chamber opening toward the inlet, a valve seat extending into the valve chamber with the surface of the face of the valve seat located transversely to the common axis of the casing, a discharge chamber on the opposite side of the valve seat from the valve chamber, two piston chambers located above and in direct line with the discharge chamber, two pistons each of a diameter greater than the diameter of the valve operatable within their respective chambers, the said chambers and the said valve and the said valve seat are located in the order mentioned and in a direct line on a common axis, a spindle on which the said valve and the said two pistons are rigidly attached in their respective positions, a by-pass with a pilot valve located therein connecting the said valve chamber and the uppermost piston chamber, a by-pass connecting the diaphragm chamber shown in the said pilot valve with the low pressure side of the first said valve, a by-pass with a stop valve located therein connecting the high pressure side of the valve and the low pressure side of the valve, and means adjustable to yield to varying pressure under the one of the said pistons located nearest to the said discharge chamber, as and for the purpose set forth.

10. In a pressure regulating valve comprising a casing or body having an inlet and an outlet, a valve chamber, a valve in the valve chamber opening toward the inlet, a valve seat extending into the valve chamber with the surface of the face of the valve seat located transversely to the common axis of the casing, a discharge chamber on the opposite side of the valve seat from the valve chamber, two piston chambers located above and in direct line with the discharge chamber, two pistons each of a diameter greater than the diameter of the valve operatable within their respective chambers, one of the said pistons actuates the valve to open it and the other piston actuates the valve to close it, the said chambers and the said valve and the said valve seat are located in the order mentioned and in a direct line on a common axis, a spindle on which the said valve and the said two pistons are rigidly attached in their respective positions and travel simultaneously with it in like directions, a by-pass connecting the said valve chamber and the uppermost piston chamber for supplying fluid pressure on top of the piston operating in the uppermost piston chamber, and pressure resisting means adjustable to exert varying pressure against the one of the said pistons located nearest to the said discharge chamber, as and for the purpose set forth.

In testimony whereof, I have signed my name to this specification this 7th day of September, 1918.

OWEN MARSHALL JONES.